US012595040B2

(12) United States Patent
Mellor

(10) Patent No.: US 12,595,040 B2
(45) Date of Patent: Apr. 7, 2026

(54) AIRCRAFT PASSENGER DOOR HANDLE MECHANISM

(71) Applicant: The Boeing Company, Arlington, VA (US)

(72) Inventor: Mitchell Loren Ray Mellor, Bothell, WA (US)

(73) Assignee: The Boeing Company, Arlington, VA (US)

( * ) Notice: Subject to any disclaimer, the term of this patent is extended or adjusted under 35 U.S.C. 154(b) by 83 days.

(21) Appl. No.: 18/462,888

(22) Filed: Sep. 7, 2023

(65) Prior Publication Data

US 2025/0084672 A1 Mar. 13, 2025

(51) Int. Cl.
B64C 1/14 (2006.01)

(52) U.S. Cl.
CPC .................................. B64C 1/1423 (2013.01)

(58) Field of Classification Search
CPC ...... B64C 1/1423; B64C 1/143; B64C 1/1438
See application file for complete search history.

(56) References Cited

U.S. PATENT DOCUMENTS 4,180,943 A * 1/1980 Smith ........................ E05C 9/16
49/319
2002/0000493 A1 1/2002 Erben

| | | | |
|---|---|---|---|
| 2013/0327892 A1 | 12/2013 | Gowing | |
| 2020/0181956 A1* | 6/2020 | Savidge | ................ B64C 1/1423 |
| 2021/0070416 A1* | 3/2021 | Buchet | .................... B64C 1/143 |
| 2024/0278899 A1* | 8/2024 | Boas | .................... B64C 1/1407 |

FOREIGN PATENT DOCUMENTS

| | | | | |
|---|---|---|---|---|
| CN | 103395490 | | 11/2013 | |
| CN | 105667757 | * | 6/2016 | ............... B64C 1/14 |
| CN | 111021865 | | 4/2020 | |
| CN | 112550661 | | 3/2021 | |
| CN | 115182655 | | 10/2022 | |

OTHER PUBLICATIONS

Extended European Search Report for EP 24180179.4-1004, dated Nov. 26, 2024.

* cited by examiner

*Primary Examiner* — Nicholas McFall
*Assistant Examiner* — Terri L Filosi
(74) *Attorney, Agent, or Firm* — Joseph M. Butscher; Carroll, Hoette & Butscher, LLC

(57) ABSTRACT

Systems, apparatuses, and methods provide for a door handle mechanism including a vent panel, a handle lever, and a four bar mechanism. The handle lever has a lift-to-open configuration. The four bar mechanism is coupled to the handle lever and the vent panel. The four bar mechanism is to time sequence operations to close an aircraft passenger door, latch the aircraft passenger door, lock the aircraft passenger door, and close the vent panel in response to the handle lever being toggled between a closed position and an open position.

20 Claims, 18 Drawing Sheets

102

202

201

300

1700

1702— Toggle a handle lever between a closed position and an open position

1704— Time sequencing of operations in response to the handle lever being toggled between the closed position and the open position

AIRCRAFT PASSENGER DOOR HANDLE MECHANISM

TECHNICAL FIELD

The present disclosure generally relates to aircraft passenger door handle mechanisms. More particularly, the present disclosure relates to lift to open aircraft passenger door handle mechanisms.

BACKGROUND

Aircraft passenger door handle mechanisms may typically have a rotate to open handle motion or a lift to open handle motion. Such a rotate to open handle motion configurations typically requires a complicated series of linkages and cams to achieve the required actions to vent cabin pressure, unlock, and then unlatch the door. Conversely, lift to open handle motion configurations may not typically have mechanisms associated with rotate to open handle motion configurations.

SUMMARY

As described above, lift to open handle motion configurations may not typically have mechanisms associated with rotate to open handle motion configurations. For example, lift to open handle configurations may often not include a means to vent pressure or prevent opening while pressurized local to the door.

As will be discussed in greater detail below, some systems, apparatuses, and methods described herein provide for a door handle mechanism including a vent panel, a handle lever, and a four bar mechanism. The handle lever has a lift-to-open configuration. The four bar mechanism is coupled to the handle lever and the vent panel. The four bar mechanism is to time sequence operations to close an aircraft passenger door, latch the aircraft passenger door, lock the aircraft passenger door, and close the vent panel in response to the handle lever being toggled between a closed position and an open position.

Advantageously, some examples herein present a simple handle mechanism that contains mechanical features to prevent opening the door while the cabin is pressurized. This mechanism is lighter, less expensive, and less complicated than the mechanisms that provide the same functionality in some existing aircraft. Additionally, or alternatively, some implementations herein present a passenger door handle mechanism that includes a lock, features to operate a vent panel, and features to prevent back driving the mechanism, which prevent unintended opening.

In some implementations described below, such a handle mechanism uses a "lift to open" motion to open rather than a "rotate to open" motion. This allows a more compact installation and allows the mechanism to be located aft of the door hinge, rather than under the door hinge.

In some examples below, such a handle mechanism uses a 4 bar mechanism with a floating link (e.g., a mechanism operator). Accordingly, the mechanism operator (one bar of the 4 bar mechanism) does not rotate around a fixed point. The mechanism operator controls the position of an upper link (another bar of the 4 bar mechanism) and a lower link (a further bar of the 4 bar mechanism). Advantageously, the lower link includes three locking features to ensure the door cannot open unless certain conditions are met necessary for safety. Because the handle mechanism operator does not rotate around a fixed point, and because its closed position is over-center with respect to a latch rod, application of back driving loads to the latch rod cannot unlatch the door. In some embodiments, a handle can be integrated with the mechanism operator reducing the number of joints and rotation points.

In one example, a door handle mechanism includes a vent panel, a handle lever, and a four bar mechanism. The handle lever has a lift-to-open configuration. The four bar mechanism is coupled to the handle lever and the vent panel. The four bar mechanism is to time sequence operations to close an aircraft passenger door, latch the aircraft passenger door, lock the aircraft passenger door, and close the vent panel in response to the handle lever being toggled between a closed position and an open position.

In another example, an aircraft passenger door includes a door main body and a door handle mechanism coupled to the door main body. The door handle mechanism includes a vent panel, a handle lever, and a four bar mechanism. The handle lever has a lift-to-open configuration. The four bar mechanism is coupled to the handle lever and the vent panel. The four bar mechanism is to time sequence operations to close an aircraft passenger door, latch the aircraft passenger door, lock the aircraft passenger door, and close the vent panel in response to the handle lever being toggled between a closed position and an open position.

In a further example, a method includes toggling a handle lever between a closed position and an open position, where the handle lever has a lift-to-open configuration. The method further includes timing sequencing of operations to close an aircraft passenger door, latch the aircraft passenger door, lock the aircraft passenger door, and close a vent panel in response to the handle lever being toggled between the closed position and the open position. The timing of the sequencing of operations is performed via a four bar mechanism coupled to the handle lever and the vent panel.

This Summary is provided to introduce a selection of concepts in a simplified form that are further described below in the Detailed Description. The foregoing Summary, as well as the following Detailed Description of certain implementations, will be better understood when read in conjunction with the appended drawings. This Summary is not intended to identify key features or essential features of the claimed subject matter, nor is it intended to be used as an aid in determining the scope of the claimed subject matter.

BRIEF DESCRIPTION OF THE DRAWINGS

Various examples will be described below by referencing the following drawings, in which.

DETAILED DESCRIPTION

Figure 1:
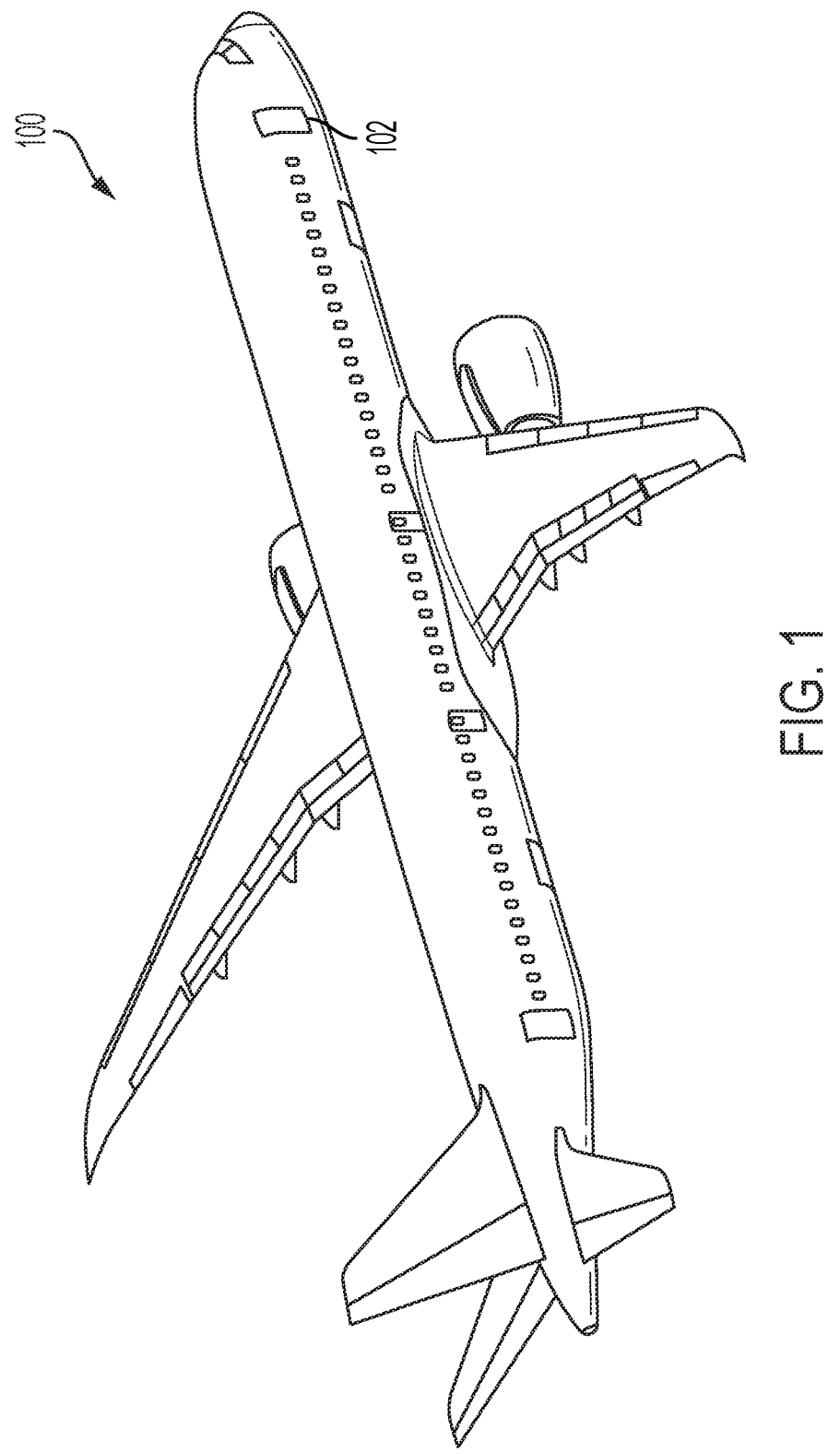
FIG. 1 is an illustration of an aircraft with an aircraft passenger door according to an example.

FIG. 1 is an illustration of an aircraft 100 with an aircraft passenger door 102 according to an example. In the illustrated example, the aircraft 100 includes an aircraft fuselage having one or more aircraft passenger door 102 located therein.

Figure 2:
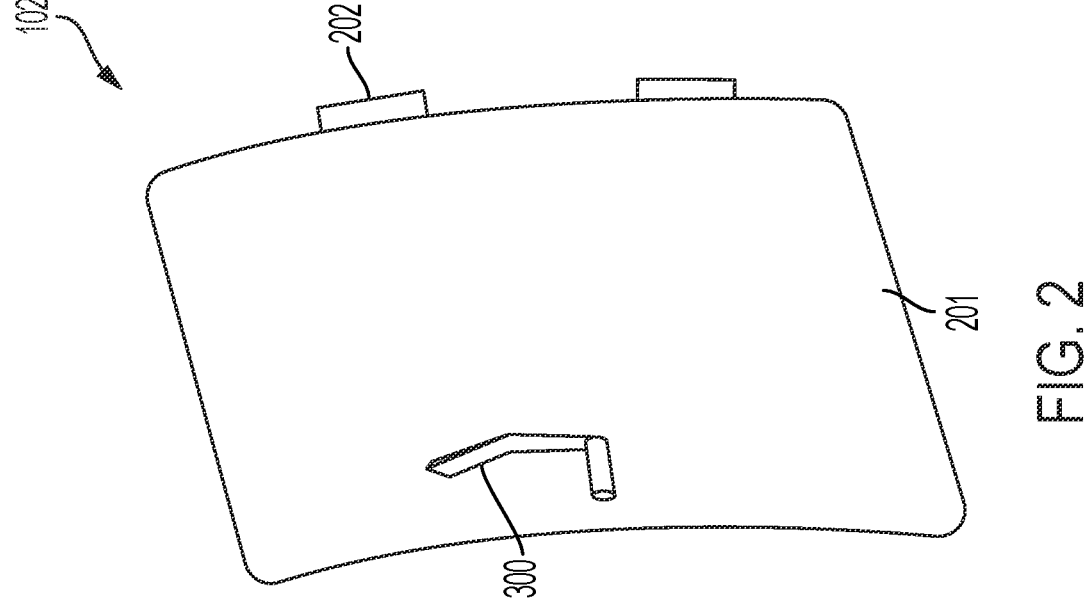
FIG. 2 is an illustration of an aircraft passenger door according to an example.

FIG. 2 is an illustration of an aircraft passenger door 102 according to an example. In the illustrated example, aircraft passenger door 102 includes a hinge 202 coupled to a door main body 201. In the illustrated example, the hinge 202 is located at an outer rim of the door main body 201.

In some implementations, a door handle mechanism 300 is coupled to the door main body 201 and is located at a spaced lateral position with respect to the hinge 202. Additional details regarding the door handle mechanism 300 will be discussed below with regard to FIGS. 3-13.

Figure 3:
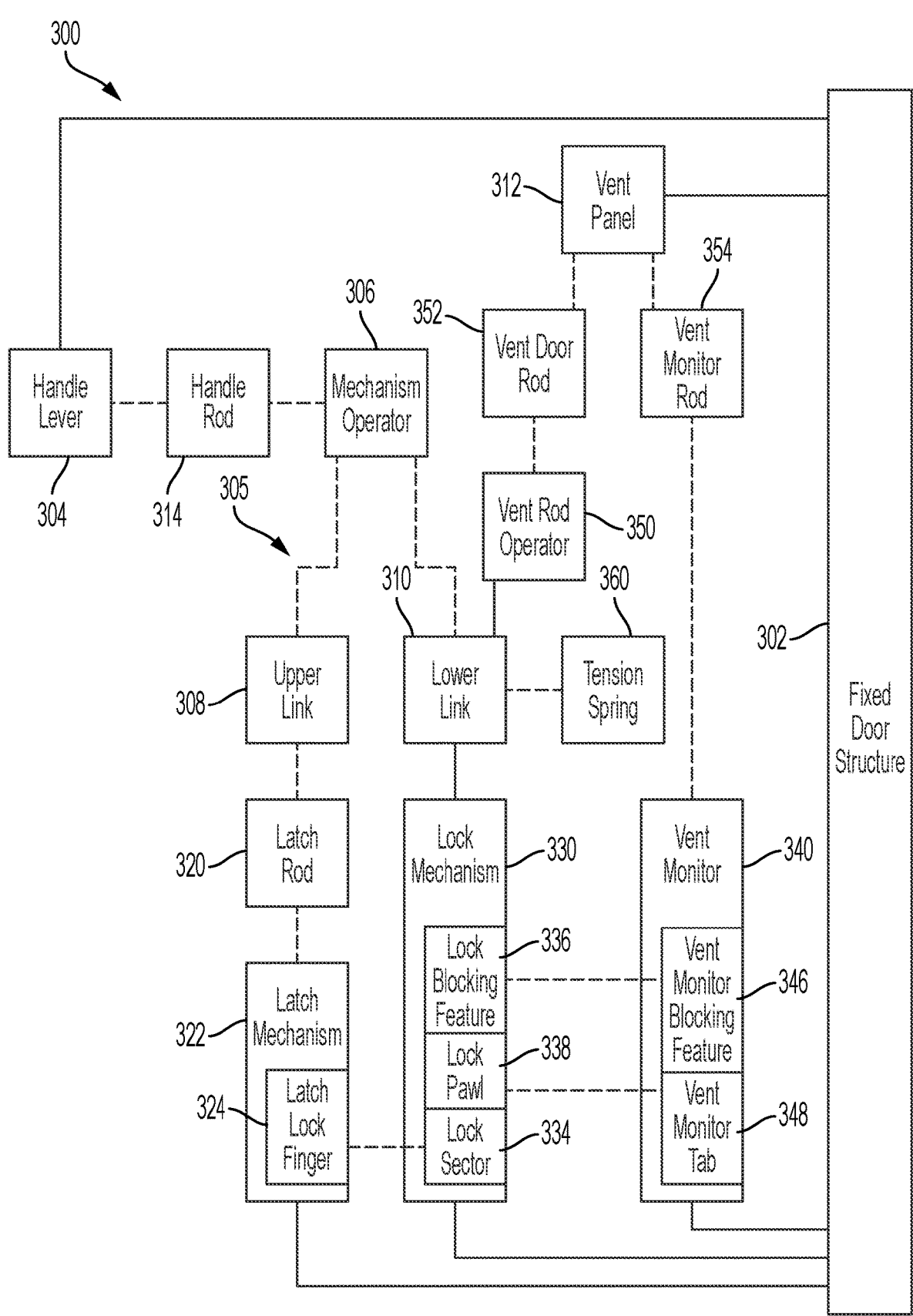
FIG. 3 is a schematic view illustrating a door handle mechanism of an aircraft passenger door according to an example.

FIG. 3 is a schematic view illustrating a door handle mechanism 300 of an aircraft passenger door according to an example. In the illustrated example, the door handle mechanism 300 includes a vent panel 312, a handle lever 304, and a four bar mechanism 305 coupled to the handle lever 304 and the vent panel 312.

In operation, the four bar mechanism 305 is to time sequence operations to close the aircraft passenger door 102 (see, e.g., FIG. 2), latch the aircraft passenger door 102, lock the aircraft passenger door 102, and close the vent panel 312 in response to the handle lever 304 being toggled between a closed position and an open position.

As used herein the term "four bar mechanism" refers to a four-bar linkage (e.g., a four bar) of four bodies, called bars or links, connected in a loop by four joints that forms a closed-chain movable linkage mechanism.

In the illustrated example, the four bar mechanism 305 includes mechanism operator 306, upper link 308, lower link 310 and fixed door structure 302.

Figure 14:
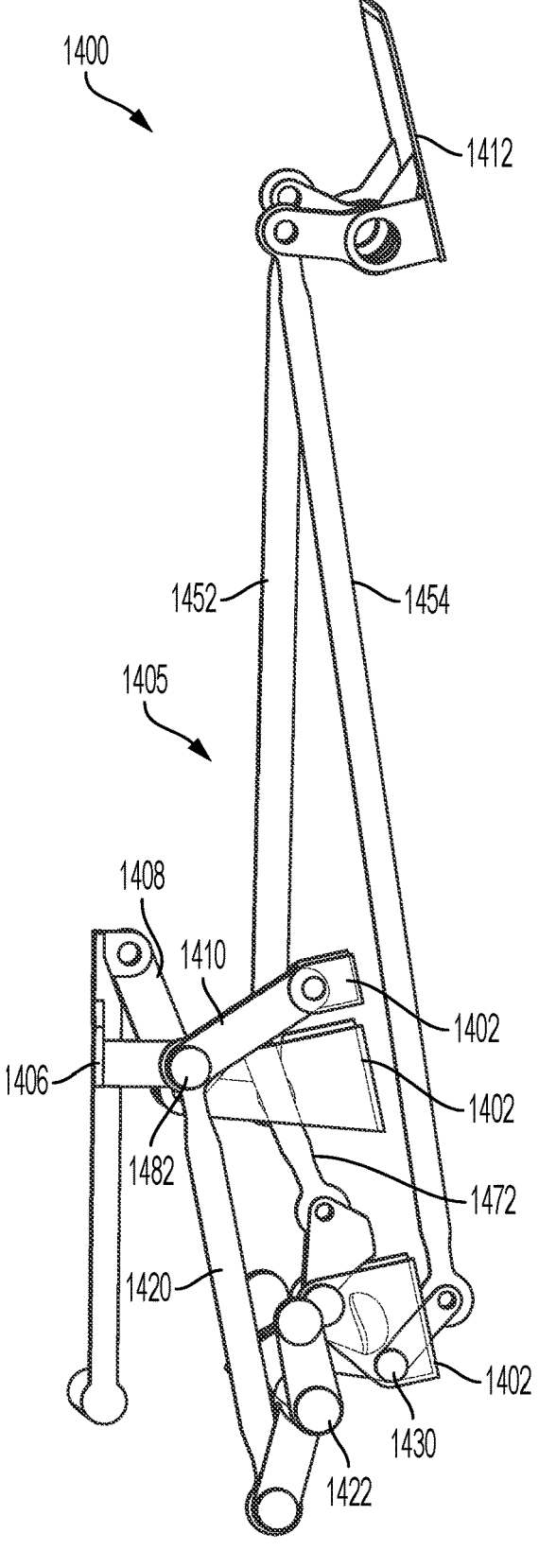
FIG. 14 is a side view illustrating another door handle mechanism of an aircraft passenger door according to another example.

In the illustrated implementation, the handle lever 304 is a separate part from each bar of the four bar mechanism 305. In such an implementation, the mechanism operator 306 is separate from the handle lever 304, and is connected via a handle rod 314. However, in other implementations, the handle lever 304 is incorporated into mechanism operator 306 (e.g., incorporated into one bar of the four bar mechanism 305, as illustrated in FIG. 14).

In some examples, the mechanism operator 306 (e.g., as one bar of the four bar mechanism 305) is configured to orbit two attached points as a floating link so as to bypass rotation about a fixed point (as illustrated in greater detail below in FIG. 7).

In some implementations, the door handle mechanism 300 further includes a tension spring 360. The tension spring 360 is to bias the mechanism operator 306 towards a closed position.

Figure 8:
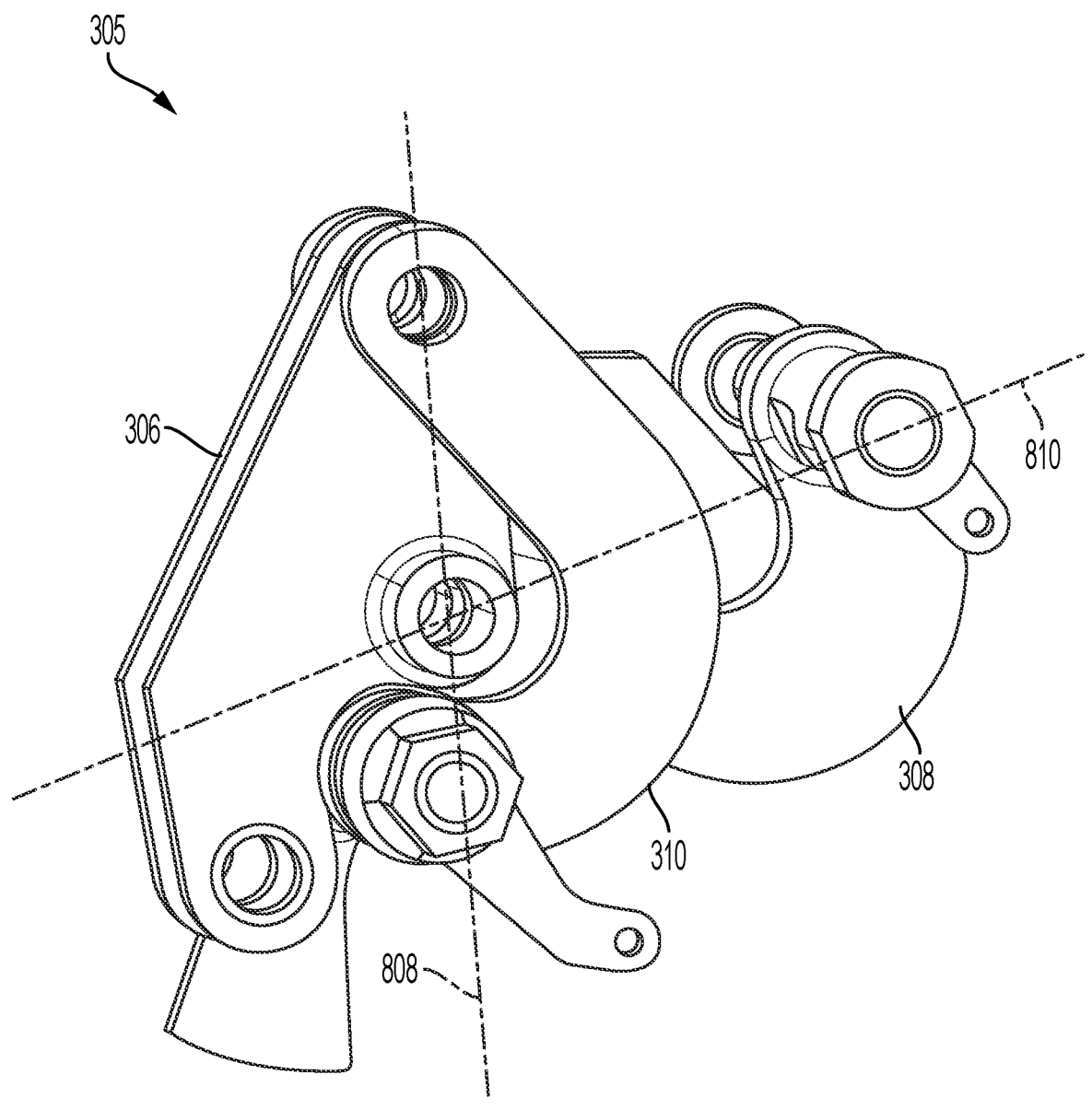
FIG. 8 is a side view illustrating components of a 4 bar mechanism of a door handle mechanism according to an example.

In some implementations, the four bar mechanism 305 has upper link 308 and lower link 310 (e.g., as two bars of the four bar mechanism 305) that are positioned to cross one another. Such an implementation is illustrated in greater detail below with regard to FIG. 8. As illustrated in FIG. 8, the upper link 308 and the lower link 310 (e.g., as two bars of the four bar mechanism 305) have lines of action so as to cross one another in operation. More specifically, the upper link 308 has a line of action 808 and the lower link 10 has a line of action 810, where the upper link 308 line of action 808 crosses the lower link 310 line of action 810.

Figure 12:
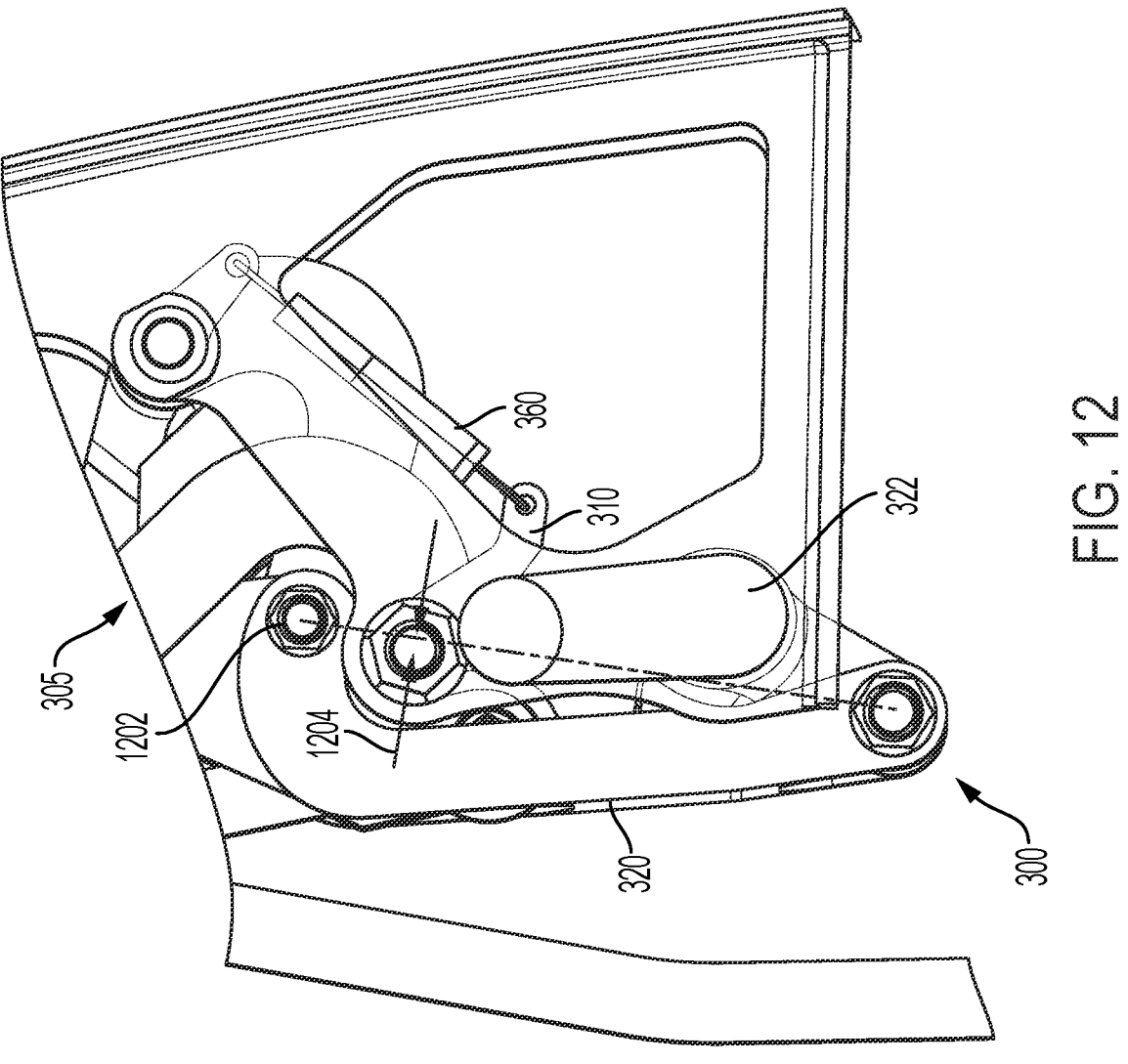
FIG. 12 is a side view illustrating a tension spring of a door handle mechanism according to an example.

Referring back to FIG. 3, in some examples, the door handle mechanism 300 further includes a latch rod 320 and a latch mechanism 322. The latch rod 320 is coupled to the four bar mechanism 305 via a latch shaft 1202 (e.g., see FIG. 12). The latch mechanism 322 is coupled to the latch rod 320. Referring to FIG. 12, the latch shaft 1202 has an over-center position 1204 when the aircraft passenger door 102 (e.g., see FIG. 2) is locked. The over-center position 1204 is to drive the latch mechanism 322 towards a locking position prior to driving the latch mechanism 322 towards an unlocking position to prevent the latch mechanism 322 from being capable of back-driving a lock mechanism 330.

Referring back to FIG. 3, the lower link 310 (e.g., as one bar of the four bar mechanism 305) is associated with a lock mechanism 330. The lock mechanism 330 includes one or more of the following locking features: a lock sector 334 to lock a latch mechanism 322, a lock blocking feature 336 to prevent opening of the aircraft passenger door 102 when the vent panel 312 is closed, or a lock pawl 338 to prevent closing the vent panel 312 until the aircraft passenger door 102 is locked.

More specifically, the lock sector 334 is to lock the latch mechanism 322 via a latch lock finger 324 of the latch mechanism 322. Further, the lock mechanism 330 also interacts with a vent monitor 340 to control operation of the vent panel 312. For example, the lock blocking feature 336 is to prevent opening of the aircraft passenger door 102 when the vent panel 312 is closed via interaction with a vent monitor blocking feature 346 of vent monitor 340. Similarly, the lock pawl 338 is to prevent closing the vent panel 312 until the aircraft passenger door 102 is locked via interaction with a vent monitor tab 348 of vent monitor 340.

In some implementations, subject to the control of the interaction of the lock mechanism 330 and the vent monitor 340, the lower link 310 activates vent panel 312 via a vent rod operator 350 connected to the vent panel 312 via vent panel rod 352. The vent monitor 340 similarly is connected to the vent panel 312 via vent monitor rod 354.

Additional details regarding the design and operation of individual elements of door handle mechanism 300 are found below in FIGS. 4-13.

Figure 4:
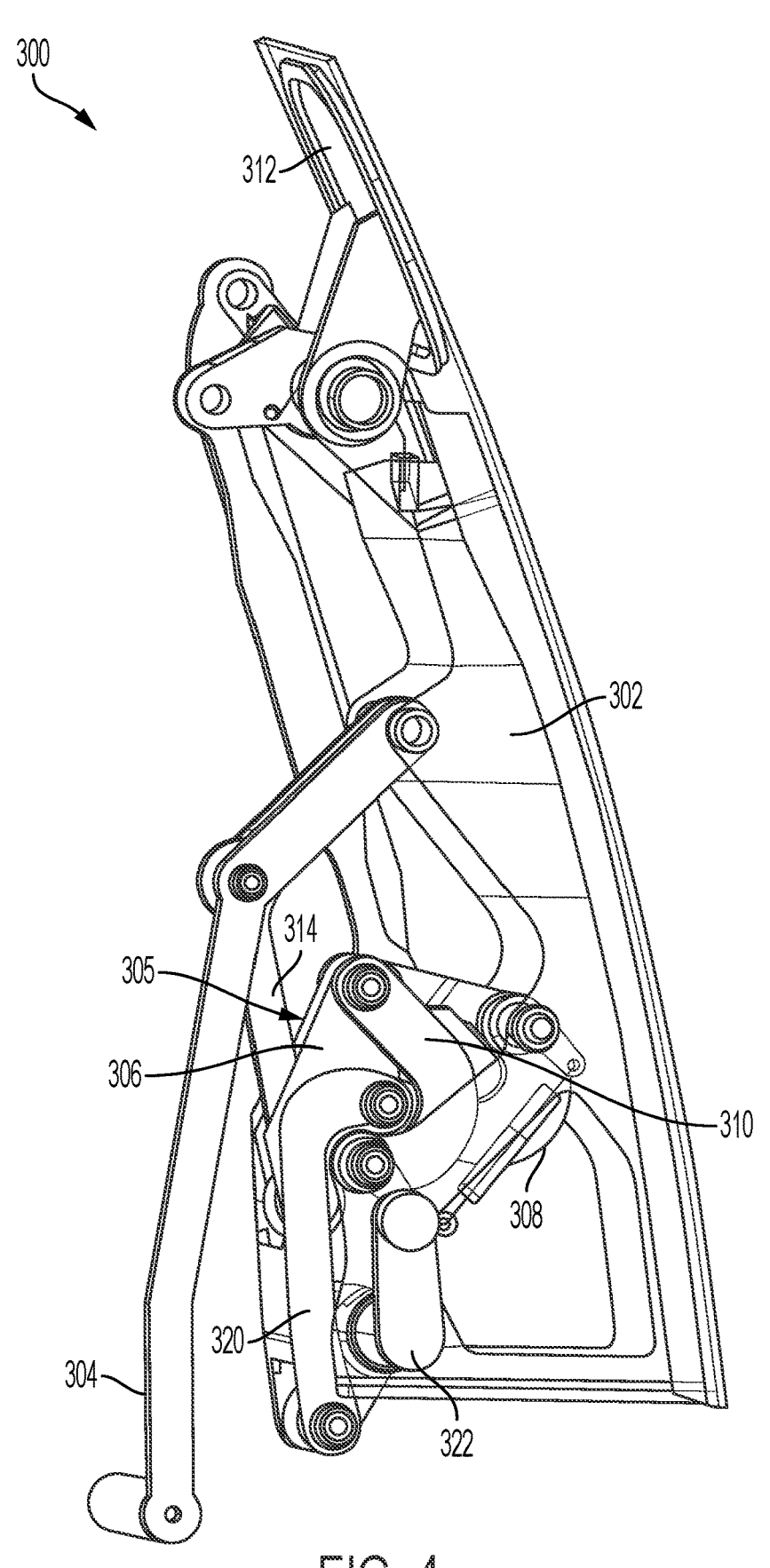
FIG. 4 is a side view illustrating a door handle mechanism of an aircraft passenger door according to an example.

FIG. 4 is a side view illustrating a door handle mechanism 300 according to an example. In the illustrated example, handle lever 304 is shown in a lift to open arrangement.

In some implementations, the four bar mechanism 305 may control a handle locking feature and a vent panel monitor feature. Additional details regarding such operations can be found below in the discussion of FIG. 18. The four bar mechanism 305 can be timed to ensure proper sequencing.

Figure 5:
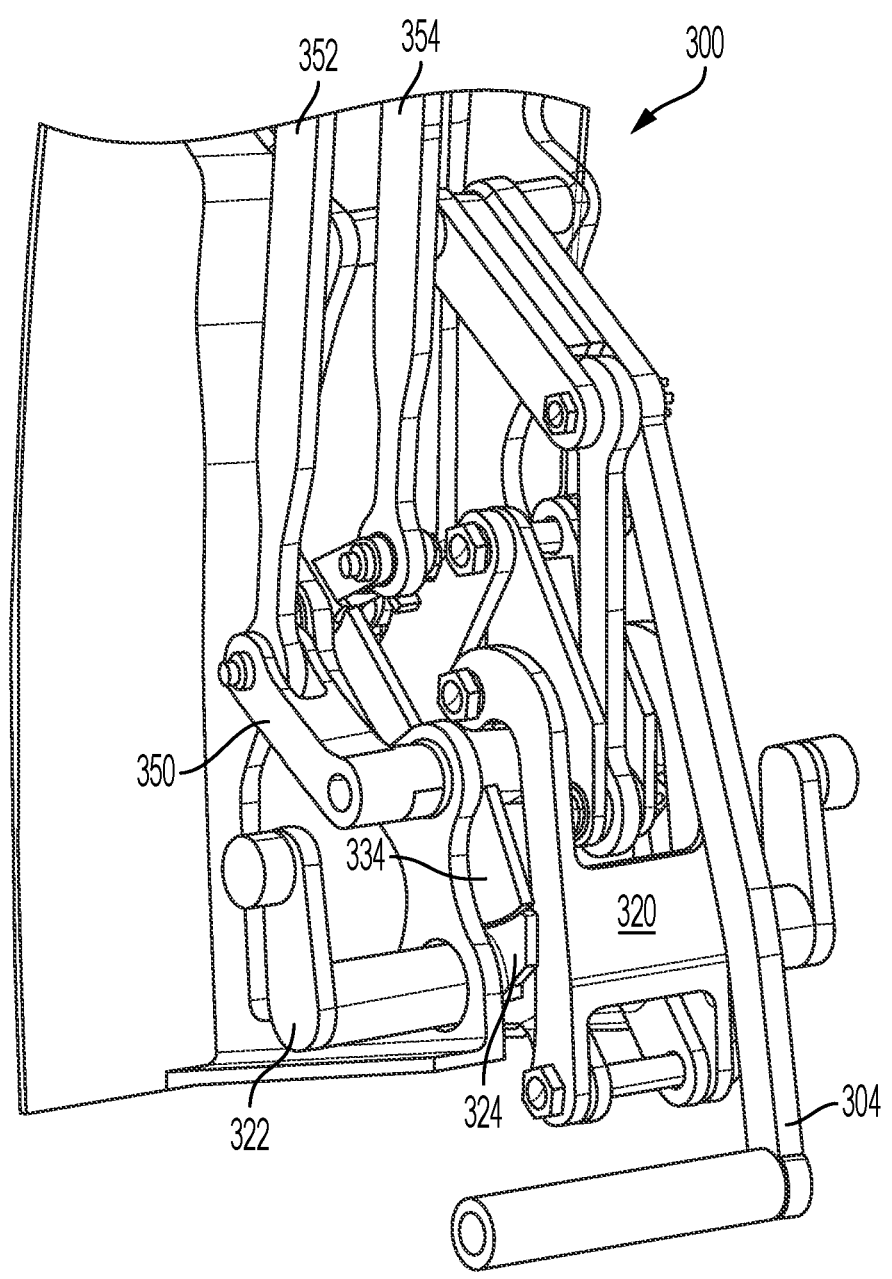
FIG. 5 is a perspective view illustrating a door handle mechanism of an aircraft passenger door according to an example.

FIG. 5 is a perspective view illustrating a door handle mechanism 300 according to an example. In the illustrated example, latch mechanism 322 rotates in the counter clockwise direction to move from the latched position (illustrated here) to an unlatched position.

In some implementations, the lock sector 334 of a lock mechanism blocks the latch mechanism 322 from rotation in the counter clockwise direction.

Figure 6:
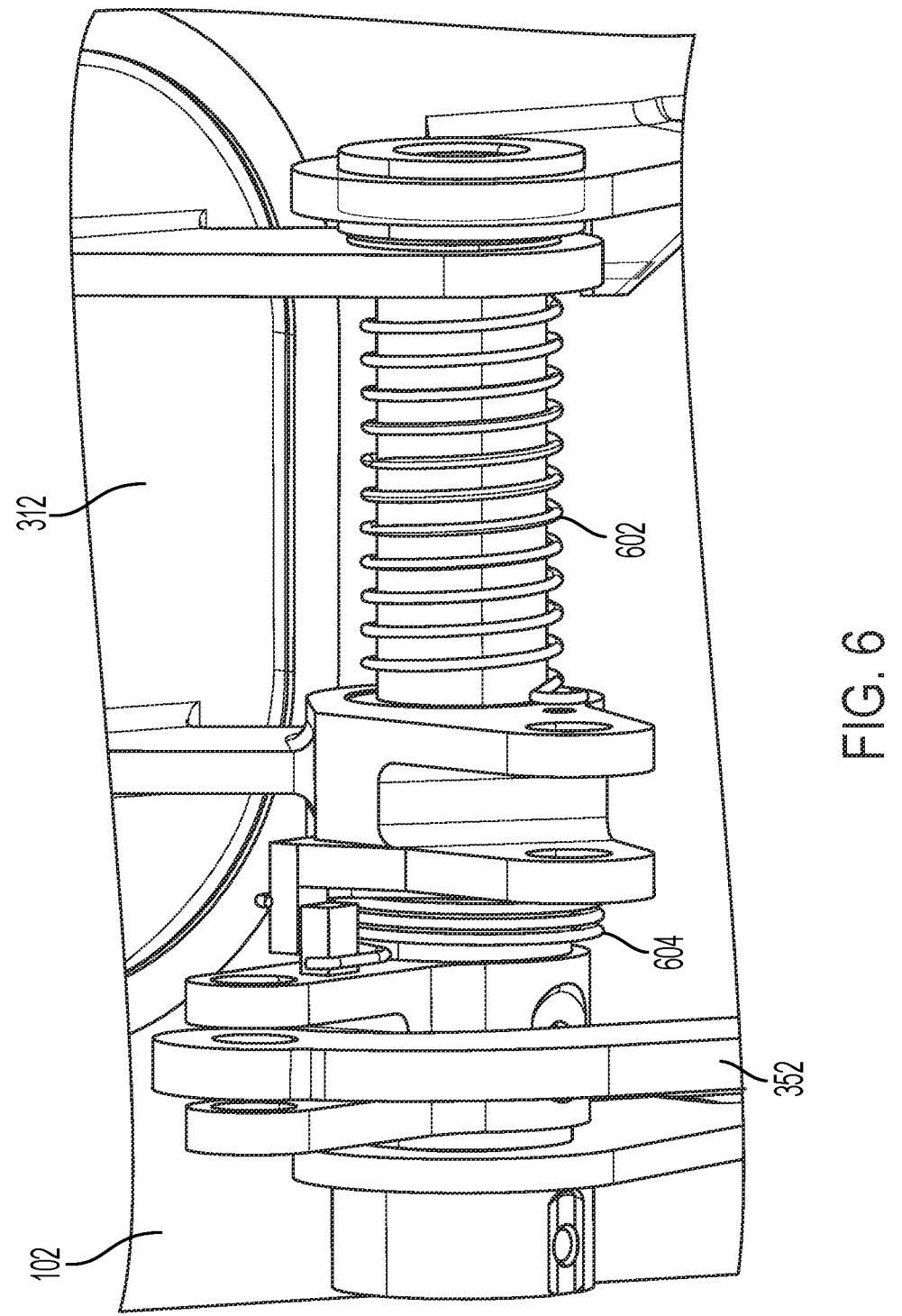
FIG. 6 is a side view illustrating a biasing mechanism for a vent panel of a door handle mechanism according to an example.

FIG. 6 is a side view illustrating a biasing mechanism 602 for a vent panel 312 according to an example. In the illustrated example, the biasing mechanism 602 is to bias the vent panel 312 towards an open position. The vent panel rod 352 pushes the vent panel closed against the forces of the biasing mechanism 602. Meanwhile, operator spring 604 holds the vent panel 312 unless the spring force is exceeded by airplane pressure forces that tend to hold the vent panel 312 closed.

As illustrated, the vent panel 312 is a small door within the aircraft passenger door 102. The vent panel 312 remains open until the aircraft passenger door 102 is locked. This prevents the aircraft from being pressurized if the door is not locked. Similarly, the vent panel 312 is to be opened before the door can become unlocked. This prevents the aircraft passenger door 102 from being opened when the aircraft is pressurized.

Accordingly, the vent panel 312 will remain closed when the cabin is pressurized. Mechanisms will keep the aircraft passenger door locked to prevent aircraft passenger door locked from opening when the vent panel 312 is closed. Likewise, the aircraft passenger door is prevented from opening when the cabin is pressurized. This prevents unsafe opening that could injure a door operator.

Figure 7:
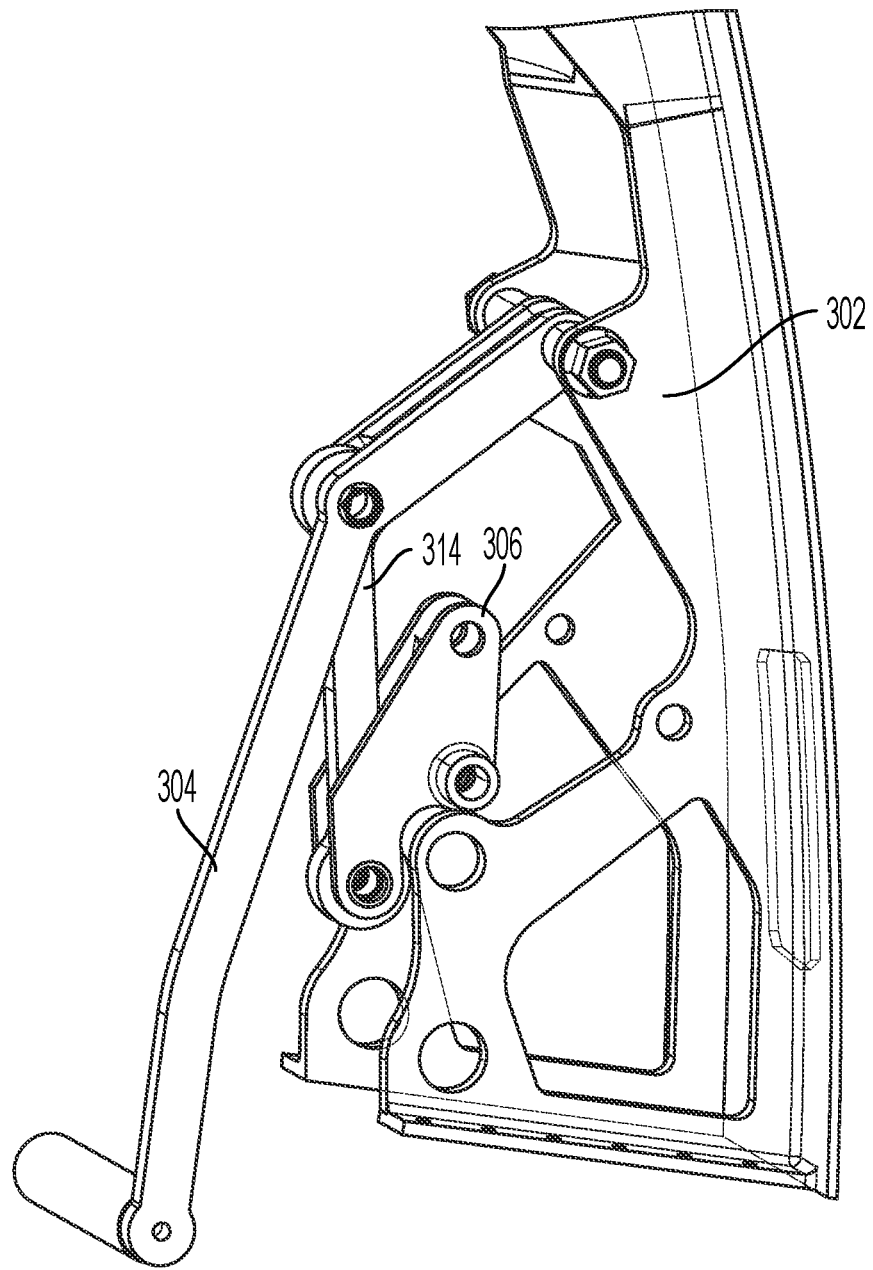
FIG. 7 is a side view illustrating a mechanism operator of a door handle mechanism according to an example.

FIG. 7 is a side view illustrating a mechanism operator of a door handle mechanism according to an example. In the illustrated example, the mechanism operator 306 is separate from the handle lever 304, and is connected via handle rod 314.

As illustrated, mechanism operator 306 rotates around two shafts. More specifically, the mechanism operator 306 is configured to orbit two attached points as a floating link so as to bypass rotation about a fixed point.

FIG. 8 is a side view illustrating components of a 4 bar mechanism 305 according to an example. In the illustrated example, the four bar mechanism 305 has upper link 308 and lower link 310 (e.g., as two bars of the four bar mechanism 305) that are positioned to cross one another. As illustrated in FIG. 8, the upper link 308 and the lower link 310 (e.g., as two bars of the four bar mechanism 305) have lines of action so as to cross one another in operation. More specifically, the upper link 308 has a line of action 808 and the lower link 10 has a line of action 810, where the upper link 308 line of action 808 crosses the lower link 310 line of action 810.

In the illustrated implementation, fixed door structure (as one bar of the four bar mechanism 305) has been removed for clarity. As illustrated, mechanism operator 306 rotates around the lower link 310 on a common shaft. Similarly, mechanism operator 306 rotates around the upper link 308 on another common shaft.

Figure 9:
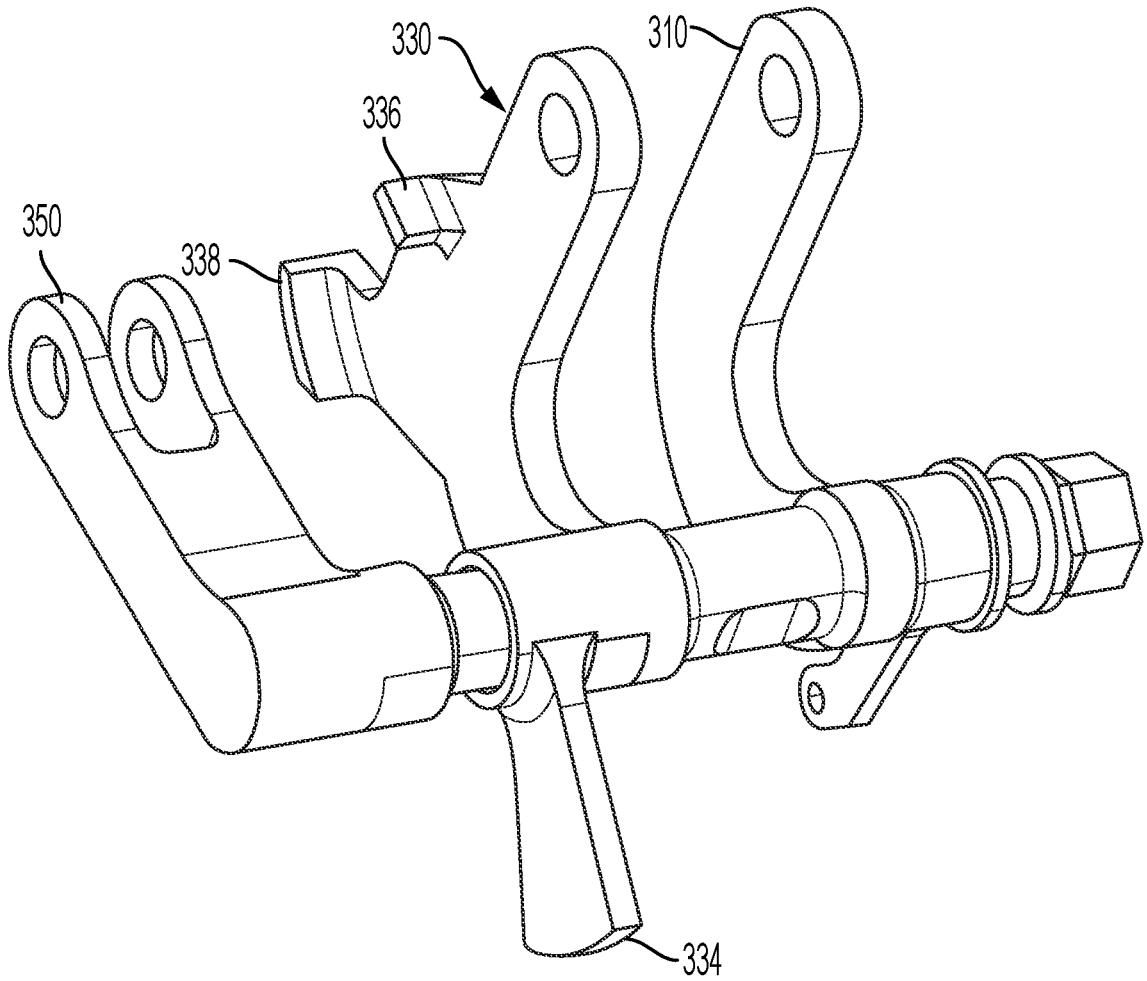
FIG. 9 is a perspective view illustrating components of a lower link of a door handle mechanism according to an example.

FIG. 9 is a perspective view illustrating components of a lower link 310 according to an example. In the illustrated example, the lower link 310 operates lock mechanism 330 and vent rod operator 350.

As illustrated, lock mechanism 330 includes lock sector 334, lock blocking feature 336, and lock pawl 338. As described above with respect to FIG. 3, the lower link (e.g., as one bar of the four bar mechanism 305) is associated with a lock mechanism 330. The lock mechanism 330 includes one or more of the following locking features: a lock sector 334 to lock a latch mechanism 322, a lock blocking feature 336 to prevent opening of the aircraft passenger door 102 when the vent panel 312 is closed, or a lock pawl 338 to prevent closing the vent panel 312 until the aircraft passenger door 102 is locked. More specifically, the lock sector 334 is to lock the latch mechanism 322 via a latch lock finger 324 of the latch mechanism 322.

Figure 10:
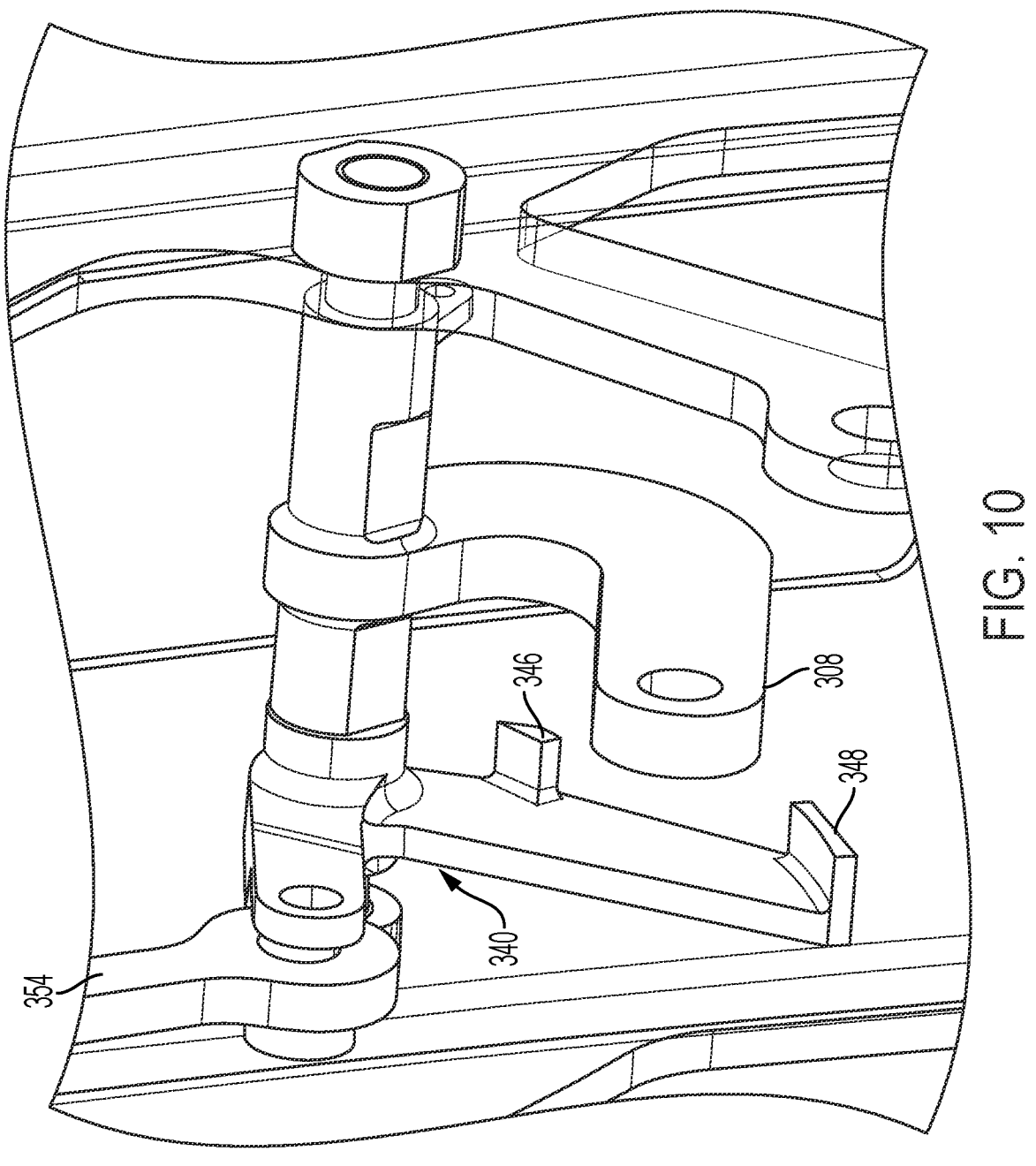
FIG. 10 is a perspective view illustrating components of an upper link of a door handle mechanism according to an example.

FIG. 10 is a perspective view illustrating components of an upper link 308 according to an example. In the illustrated example, the upper link 308 and vent monitor 340 share a common shaft but rotate independently of one another.

In some examples, vent monitor 340 interacts with a vent panel via vent rod operator 350. As illustrated, vent monitor 340 includes a vent monitor blocking feature 346 and a vent monitor tab 348.

As described above with respect to FIG. 3, the vent monitor blocking feature 346 and vent monitor tab 348 prevent the lower link 310 from rotating in some conditions. For example, the vent monitor blocking feature 346 and vent monitor tab 348 prevent door unlocking when the vent panel 312 is closed and prevent the door from unlocking when the vent is open. Accordingly, the vent monitor blocking feature 346 operates as a vent closed blocking stop, while the vent monitor tab 348 operates as a vent open blocking stop.

More specifically, the lock mechanism 330 interacts with the vent monitor 340 to control operation of the vent panel 312. For example, the lock blocking feature 336 is to prevent opening of the aircraft passenger door 102 when the vent panel 312 is closed via interaction with a vent monitor blocking feature 346 of vent monitor 340. Similarly, the lock pawl 338 is to prevent closing the vent panel 312 until the aircraft passenger door 102 is locked via interaction with a vent monitor tab 348 of vent monitor 340.

FIGS. 11A-11D illustrates components of a lock mechanism of in operation according to an example. In the illustrated example, the vent panel cannot close until the aircraft passenger door is closed.

Figure 11D:
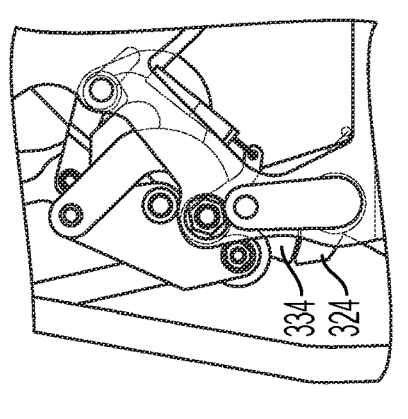
FIGS. 11A-11D illustrates components of a lock mechanism of a door handle mechanism in operation according to an example.
Figure 11C:
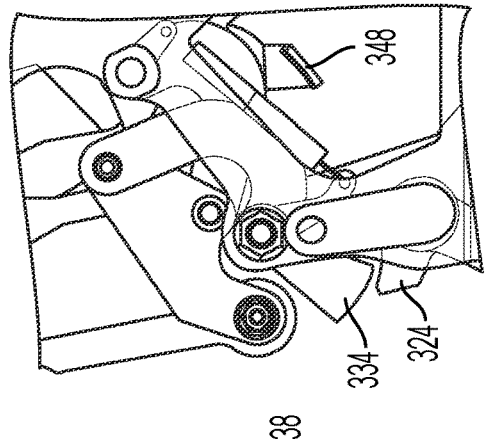
Figure 11B:
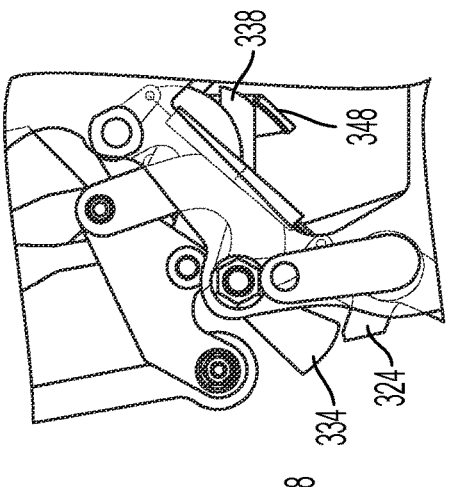
Figure 11A:
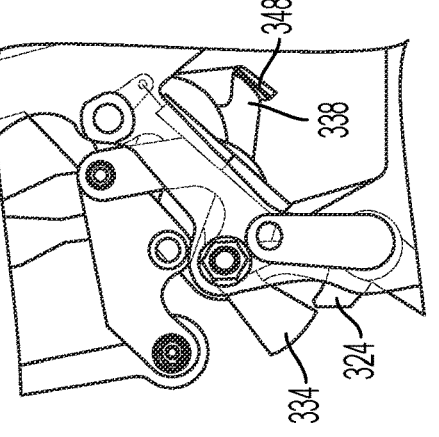

More specifically, FIG. 11A illustrates that the lock pawl 338 is engaged with the vent monitor tab 348 while latch lock finger 324 is not engaged with the lock sector 334. Accordingly, the lock pawl 338 prevents the vent panel from closing during a door closing sequence and the door remains unlocked and the vent panel is open.

FIG. 11B illustrates that the lock pawl 338 remains engaged with the vent monitor tab 348 while latch lock finger 324 is now engaged with the lock sector 334. Accordingly, the lock pawl 338 prevents the vent panel from closing during the door closing sequence and the door is now locked and the vent panel is open.

FIG. 11C illustrates that the lock pawl 338 is now disengaged from the vent monitor tab 348 while latch lock finger 324 remains engaged with the lock sector 334. Accordingly, the lock pawl 338 no longer prevents the vent panel from closing during the door closing sequence and the door remains locked and the vent panel is open.

FIG. 11D illustrates that after the lock pawl 338 is disengaged from the vent monitor tab 348 and the latch lock finger 324 remains engaged with the lock sector 334 the vent panel may now close.

FIG. 12 is a side view illustrating a tension spring 360 of a door handle mechanism according to an example, the door handle mechanism 300 further includes tension spring 360. The tension spring 360 is to bias the mechanism operator 306 towards a closed position.

In the illustrated example, the door handle mechanism 300 further includes a latch rod 320 and a latch mechanism 322. The latch rod 320 is coupled to the four bar mechanism 305 via a latch shaft 1202. The latch mechanism 322 is coupled to the latch rod 320. The latch shaft 1202 has an over-center position 1204 when the aircraft passenger door 102 (e.g., see FIG. 2) is locked. The over-center position 1204 is to drive the latch mechanism 322 towards a locking position prior to driving the latch mechanism 322 towards an unlocking position to prevent the latch mechanism 322 from being capable of back-driving a lock mechanism 330 (e.g., see FIG. 9).

Figure 13:
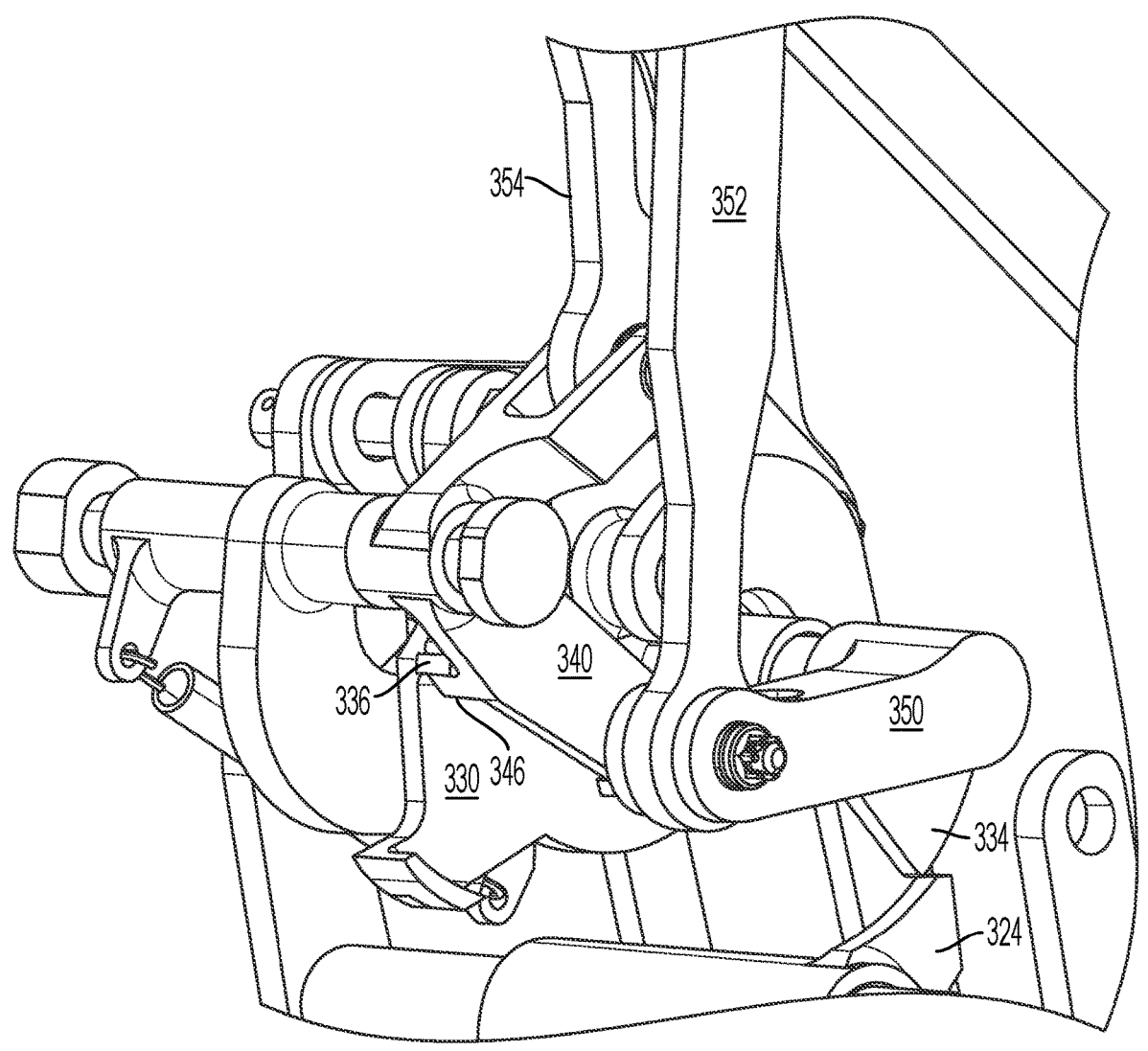
FIG. 13 illustrates components of a lock mechanism of a door handle mechanism in operation according to an example.

FIG. 13 illustrates components of a lock mechanism 330 in operation according to an example. In the illustrated example, the lock blocking feature 336 of the lock mechanism 330 engages with the vent monitor blocking feature 346 of the vent monitor 340.

In operation, such interaction between the lock blocking feature 336 and the vent monitor blocking feature 346 prevents the lock sector 334 from moving out of the way of latch lock finger 324, ensuring a locked condition.

FIG. 14 is a side view illustrating another door handle mechanism 1400 according to another example. In the illustrated example, the handle lever is incorporated into mechanism operator 1406 (e.g., incorporated into one bar of the four bar mechanism 1405).

In some examples, the mechanism operator 1406 (e.g., as one bar of the four bar mechanism 1405) is configured to orbit two attached points as a floating link so as to bypass rotation about a fixed point (similar to the implementation illustrated in greater detail below in FIG. 7).

In the illustrated example, the door handle mechanism 1400 includes a vent panel 1412 and a four bar mechanism 1405 coupled to the vent panel 1412.

In operation, the four bar mechanism 1405 is to time sequence operations to close the aircraft passenger door 102 (see, e.g., FIG. 2), latch the aircraft passenger door 102, lock the aircraft passenger door 102, and close the vent panel 1412 in response to the handle lever incorporated into the mechanism operator 1406 being toggled between a closed position and an open position.

In the illustrated example, the four bar mechanism 1405 includes mechanism operator 1406, upper link 1408, lower link 1410 and fixed door structure 1402.

In some implementations, the four bar mechanism 1405 has upper link 1408 and lower link 1410 (e.g., as two bars of the four bar mechanism 1405) that are positioned to cross one another.

In some examples, the door handle mechanism 1400 further includes a latch rod 1420 and a latch mechanism 1422. The latch rod 1420 is coupled to the four bar mechanism 1405 via a latch shaft 1482. The latch mechanism 1422 is coupled to the latch rod 1420. Similar to the arrangement illustrated in FIG. 12, the latch shaft 1482 has an over-center position when the aircraft passenger door 102 (e.g., see FIG. 2) is locked. The over-center position is to drive the latch mechanism 1422 towards a locking position prior to driving the latch mechanism 1422 towards an unlocking position to prevent the latch mechanism 1422 from being capable of back-driving a lock mechanism 1430.

The lower link 1410 (e.g., as one bar of the four bar mechanism 1405) is associated with the lock mechanism 1430 via lock rod 1472.

In some implementations, subject to the control of the interaction of the lock mechanism 1430, the lower link 1410 activates vent panel 1412 via vent panel rod 1452. The vent panel 1412 is also controlled via vent monitor rod 1454.

Figure 15:
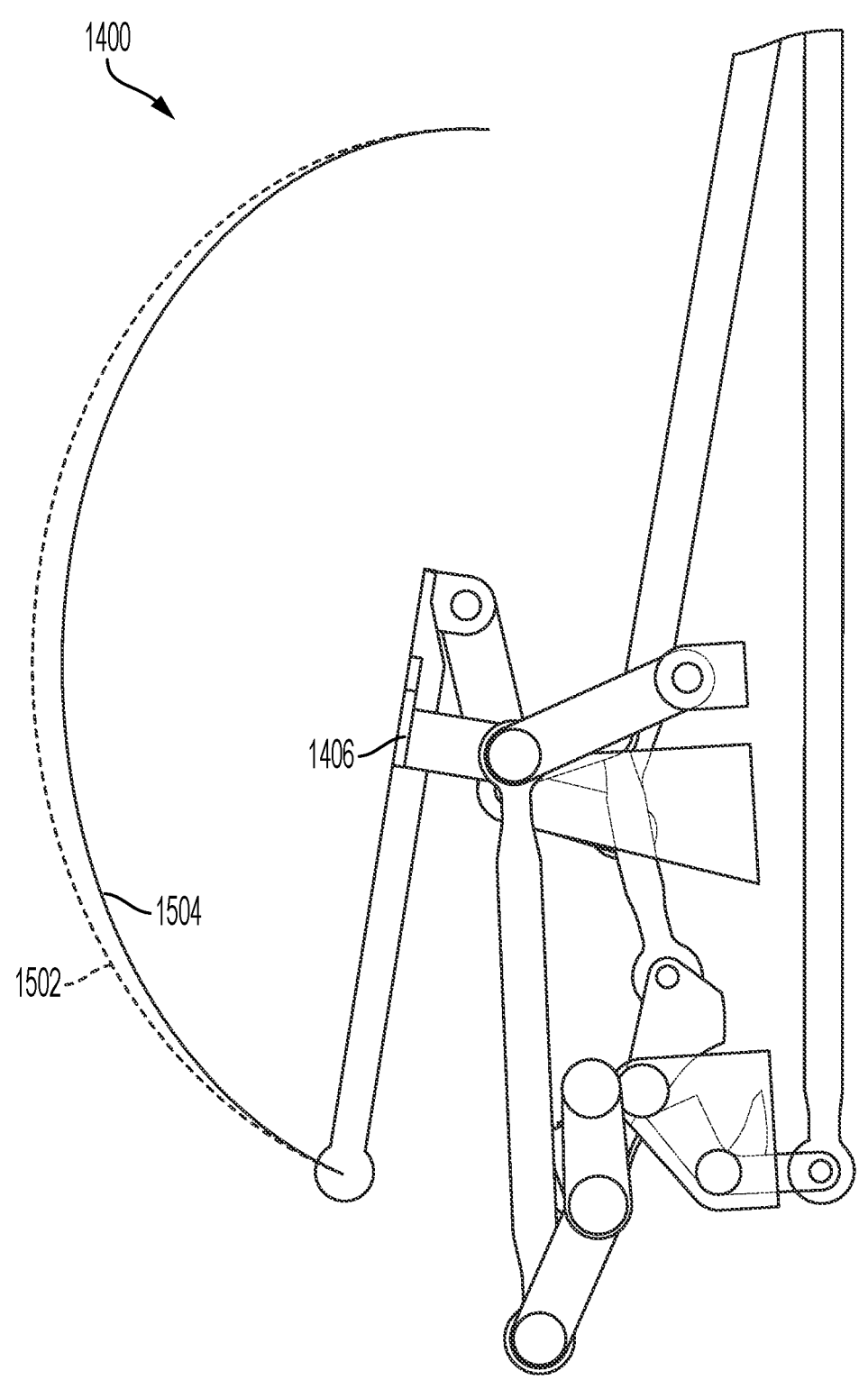
FIG. 15 illustrates components of a door handle mechanism in operation according to another example.

FIG. 15 illustrates components of a door handle mechanism in operation according to another example. In the illustrated example, the handle lever incorporated into mechanism operator 1406 has an elliptical path 1504 when open and closed (as compared to a circular path 1502).

Figure 16:
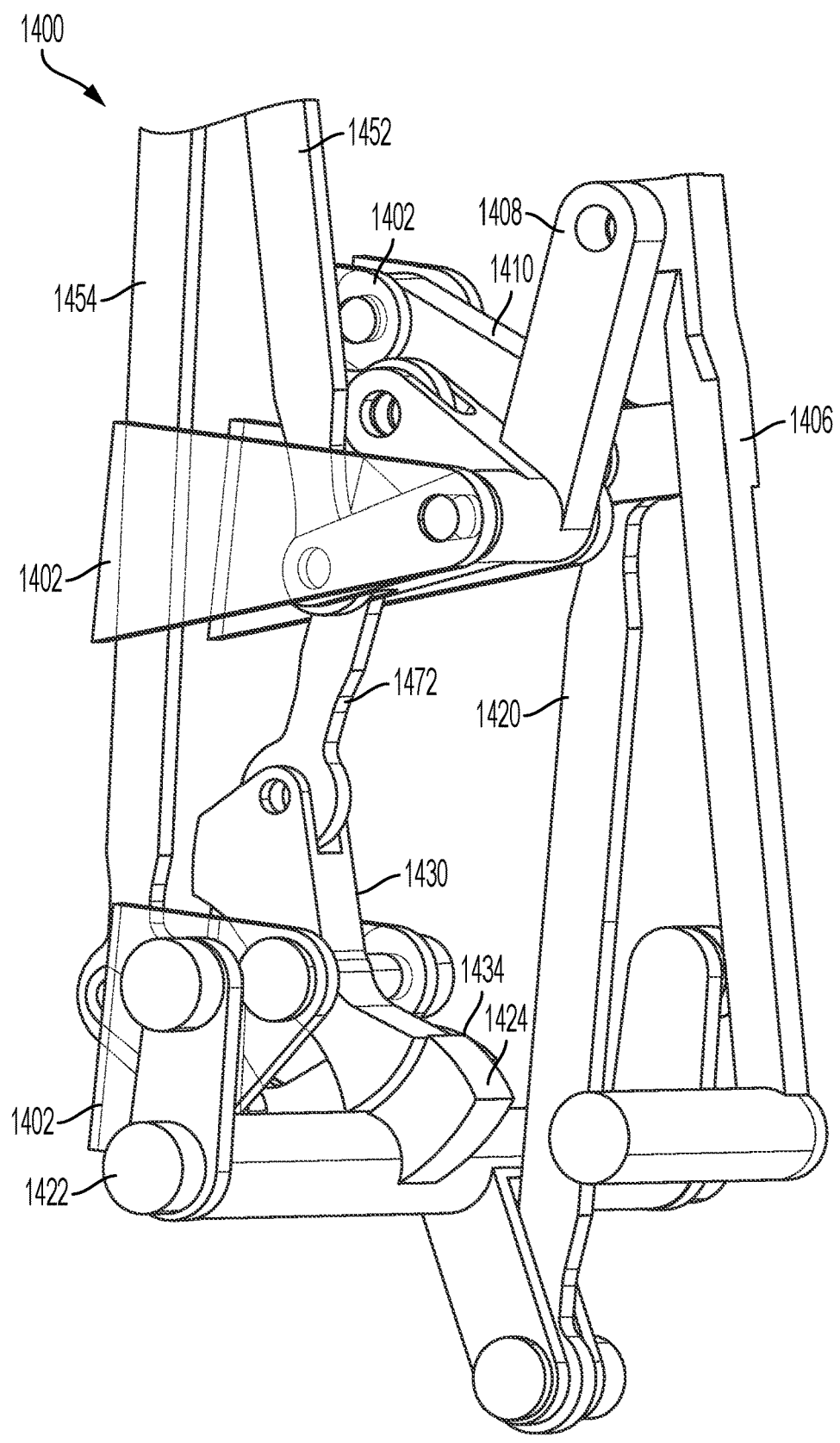
FIG. 16 is a perspective view illustrating a door handle mechanism of an aircraft passenger door according to another example.

FIG. 16 is a perspective view illustrating a door handle mechanism of an aircraft passenger door according to another example. In the illustrated example, the lock mechanism 1430 includes a lock sector 1434 to lock a latch mechanism 1422. More specifically, the lock sector 1434 is to lock the latch mechanism 1422 via a latch lock finger 1424 of the latch mechanism 1422.

Figure 17:
FIG. 17 is an illustration of a flowchart of an example method for operating an aircraft passenger door handle mechanism according to an example.
Figure 17:
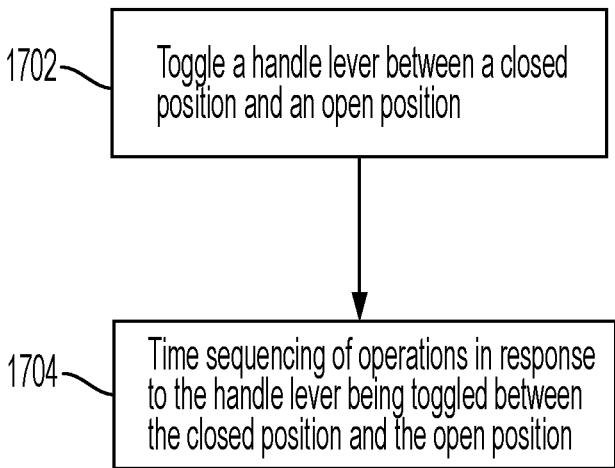

FIG. 17 shows an example method 1700 for operating a door handle mechanism for an aircraft according to an example. The method 1700 can generally be implemented for operating a door handle mechanism, such as, for example, the operating a door handle mechanism 300 (FIG. 3) and/or the operating a door handle mechanism 1400 (FIG. 14), already discussed.

Illustrated processing block 1702 provides for toggling a handle lever between a closed position and an open position. For example, a handle lever may be toggled between a closed position and an open position, where the handle lever has a lift-to-open configuration.

Illustrated processing block 1704 provides for timing sequencing of operations in response to the handle lever being toggled between the closed position and the open position. For example, a sequencing of operations may be timed to close an aircraft passenger door, latch the aircraft passenger door, lock the aircraft passenger door, and close a vent panel in response to the handle lever being toggled between the closed position and the open position. In some implementations, the timing of the sequencing of operations is performed via a four bar mechanism coupled to the handle lever and the vent panel.

Additional and/or alternative operations for method 1700 are described in greater detail below in the description of FIG. 18.

Figure 18:
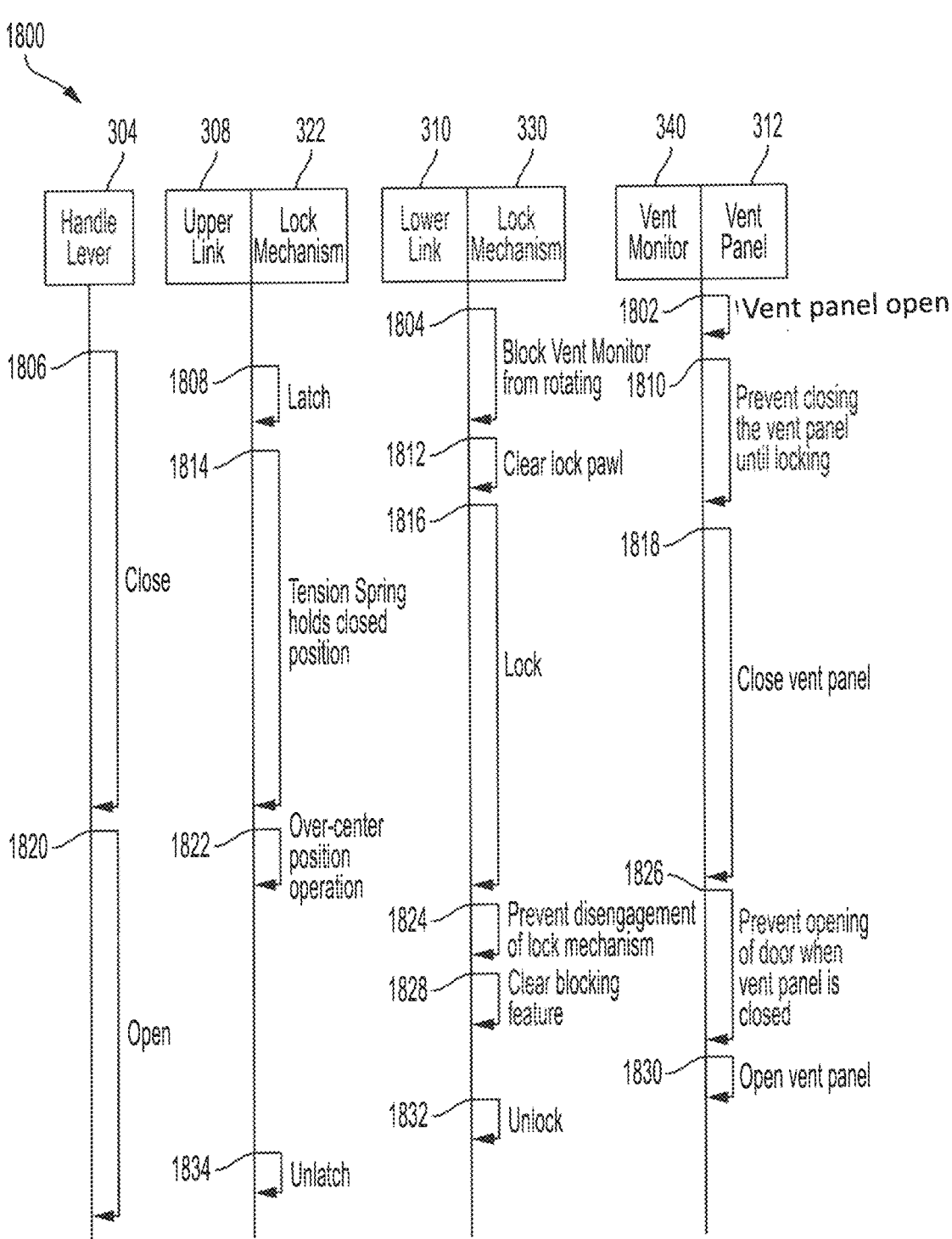
FIG. 18 is an illustration of a flowchart of a further example method for operating an aircraft passenger door handle mechanism according to an example.

FIG. 18 is a flowchart of an example of another method 1800 for operating a door handle mechanism for an aircraft according to an example. The method 1800 can generally be implemented for operating a door handle mechanism, such as, for example, the operating a door handle mechanism 300 (FIG. 3) and/or the operating a door handle mechanism 1400 (FIG. 14), already discussed.

Illustrated processing block 1802 provides for the process starting with a vent panel open. For example, a vent panel may be in an open position prior to beginning closing of an aircraft passenger door.

Illustrated processing blocks 1804-1818 may occur a closing of the aircraft passenger door at illustrated processing block 1806.

Illustrated processing block 1804 provides for blocking a vent monitor from rotating. For example, a vent monitor may be blocked from rotating via a lock pawl of a locking mechanism engaging the vent monitor.

Illustrated processing block 1808 provides for latching the aircraft passenger door. For example, the aircraft passenger door may be latched via a latch mechanism.

Illustrated processing block 1810 provides for preventing closing the vent panel until locking. For example, closing the vent panel is prevented until the aircraft passenger door is locked in response to the lock pawl engaging the vent monitor.

Illustrated processing block 1812 provides for clearing the lock pawl. For example, the lock pawl may be cleared from the vent monitor.

Illustrated processing block 1814 provides for a tension spring holding the closed position.

Illustrated processing block 1816 provides for locking the aircraft passenger door. For example, the aircraft passenger door may be locked via the locking mechanism.

Illustrated processing block 1818 provides for closing the vent panel. For example, the vent panel may be closed at the end of closing of the handle lever.

Illustrated processing blocks 1822-1834 may occur an opening of the aircraft passenger door at illustrated processing block 1820.

Illustrated processing block 1822 provides for over-center position operations. For example, the latch mechanism may be driven towards a locking position prior to driving the latch mechanism towards an unlocking position to prevent the latch mechanism from being capable of back-driving the lock mechanism based on such an over-center position.

Illustrated processing block 1824 provides for preventing disengagement of lock mechanism. For example, disengagement of the lock mechanism may be prevented via a lock blocking feature of the locking mechanism engaging the vent monitor.

Illustrated processing block 1826 provides for preventing opening of the aircraft passenger door when the vent panel is closed. For example, preventing opening of the aircraft passenger door may be prevented when the vent panel is closed in response to the lock blocking feature engaging the vent monitor.

Illustrated processing block 1828 provides for clearing the lock blocking feature. For example, the lock blocking feature may be cleared from the vent monitor.

Illustrated processing block 1830 provides for opening the vent panel.

Illustrated processing block 1832 provides for unlocking the aircraft passenger door. For example, the aircraft passenger door may be unlocked via the locking mechanism.

Illustrated processing block 1834 provides for unlatching the aircraft passenger door. For example, the aircraft passenger door may be unlatched via the latch mechanism.

Additional Notes and Examples

Clause 1. An aircraft passenger door including: a door main body; and a door handle mechanism coupled to the door main body. The door handle mechanism includes: a vent panel; a handle lever having a lift-to-open configuration; and a four bar mechanism coupled to the handle lever and the vent panel. The four bar mechanism is to time sequence operations to close the aircraft passenger door, latch the aircraft passenger door, lock the aircraft passenger door, and close the vent panel in response to the handle lever being toggled between a closed position and an open position.

Clause 2. The aircraft passenger door of clause 1, further including: a hinge coupled to the door main body and located at an outer rim of the door main body; where the door handle mechanism is located at a spaced lateral position with respect to the hinge.

Clause 3. The aircraft passenger door of any one of Clauses 1 to 2, where the handle lever is incorporated into one bar of the four bar mechanism.

Clause 4. The aircraft passenger door of any one of Clauses 1 to 2, where the handle lever is a separate part from each bar of the four bar mechanism.

Clause 5. The aircraft passenger door of Clause 4, where one bar of the four bar mechanism includes a mechanism operator configured to orbit two attached points as a floating link so as to bypass rotation about a fixed point.

Clause 6. The aircraft passenger door of Clause 5, the door handle mechanism further including: a tension spring to bias the mechanism operator towards a closed position.

Clause 7. The aircraft passenger door of any one of Clauses 1 to 6, the door handle mechanism further including: a latch rod coupled to the four bar mechanism via a latch shaft; and a latch mechanism coupled to the latch rod; where the latch shaft has an over-center position when the aircraft passenger door is locked, where the over-center position is to drive the latch mechanism towards a locking position prior to driving the latch mechanism towards an unlocking position to prevent the latch mechanism from being capable of back-driving a lock mechanism.

Clause 8. The aircraft passenger door of any one of Clauses 1 to 7, where the four bar mechanism has two bars of the four bar mechanism that are positioned to cross one another.

Clause 9. The aircraft passenger door of any one of Clauses 1 to 8, where the four bar mechanism has one bar of the four bar mechanism that includes one or more of the following locking features: a lock sector to lock a latch mechanism, a lock blocking feature to prevent opening of the aircraft passenger door when the vent panel is closed, or a lock pawl to prevent closing the vent panel until the aircraft passenger door is locked.

Clause 10. The aircraft passenger door of any one of Clauses 1 to 9, the door handle mechanism further including: a biasing mechanism to bias the vent panel towards a closed position.

Clause 11. A door handle mechanism including: a vent panel; a handle lever having a lift-to-open configuration; and a four bar mechanism coupled to the handle lever and the vent panel. The four bar mechanism is to time sequence operations to close an aircraft passenger door, latch the aircraft passenger door, lock the aircraft passenger door, and close the vent panel in response to the handle lever being toggled between a closed position and an open position.

Clause 12. The door handle mechanism of Clause 11, where the handle lever is incorporated into one bar of the four bar mechanism.

Clause 13. The door handle mechanism of Clause 11, where the handle lever is a separate part from each bar of the four bar mechanism, and where one bar of the four bar mechanism includes a mechanism operator configured to orbit two attached points as a floating link so as to bypass rotation about a fixed point.

Clause 14. The door handle mechanism of Clause 13, the door handle mechanism further including: a tension spring to bias the mechanism operator towards a closed position.

Clause 15. The door handle mechanism of any one of Clauses 11 to 14, the door handle mechanism further including: a latch rod coupled to the four bar mechanism via a latch shaft; and a latch mechanism coupled to the latch rod; where the latch shaft has an over-center position when the aircraft passenger door is locked, where the over-center position is to drive the latch mechanism towards a locking position prior to driving the latch mechanism towards an unlocking position to prevent the latch mechanism from being capable of back-driving a lock mechanism.

Clause 16. The door handle mechanism of any one of Clauses 11 to 15, where the four bar mechanism has two bars of the four bar mechanism that are positioned to cross one another.

Clause 17. The door handle mechanism of any one of Clauses 11 to 16, where the four bar mechanism has one bar of the four bar mechanism that includes one or more of the following locking features: a lock sector to lock a latch mechanism, a lock blocking feature to prevent opening of the aircraft passenger door when the vent panel is closed, or a lock pawl to prevent closing the vent panel until the aircraft passenger door is locked.

Clause 18. The door handle mechanism of any one of Clauses 11 to 17, the door handle mechanism further including: a biasing mechanism to bias the vent panel towards a closed position.

Clause 19. A method including: toggling a handle lever between a closed position and an open position, where the handle lever has a lift-to-open configuration; and timing sequencing of operations to close an aircraft passenger door, latch the aircraft passenger door, lock the aircraft passenger door, and close a vent panel in response to the handle lever being toggled between the closed position and the open position, and where the timing of the sequencing of operations is performed via a four bar mechanism coupled to the handle lever and the vent panel.

Clause 20. The method of Clause 19, further including: during a closing of the aircraft passenger door: latching the aircraft passenger door via a latch mechanism; blocking a vent monitor from rotating via a lock pawl of a locking mechanism engaging the vent monitor; preventing closing the vent panel until the aircraft passenger door is locked in response to the lock pawl engaging the vent monitor; clearing the lock pawl from the vent monitor; locking the aircraft passenger door via the locking mechanism; and closing the vent panel; during an opening of the aircraft passenger door: driving the latch mechanism towards a locking position prior to driving the latch mechanism towards an unlocking position to prevent the latch mechanism from being capable of back-driving the lock mechanism; preventing disengagement of the lock mechanism via a lock blocking feature of the locking mechanism engaging the vent monitor; preventing opening of the aircraft passenger door when the vent panel is closed in response to the lock blocking feature engaging the vent monitor; clearing the lock blocking feature from the vent monitor; opening the vent panel; unlocking the aircraft passenger door via the locking mechanism; and unlatching the aircraft passenger door via the latch mechanism Clause 21 includes an apparatus comprising means for performing the function of any preceding example.

All definitions, as defined and used herein, should be understood to control over dictionary definitions, definitions in documents incorporated by reference, and/or ordinary meanings of the defined terms.

Furthermore, for ease of understanding, certain functional blocks can have been delineated as separate blocks; however, these separately delineated blocks should not necessarily be construed as being in the order in which they are discussed or otherwise presented herein. For example, some blocks can be able to be performed in an alternative ordering, simultaneously, etc.

The terms "coupled," "attached," or "connected" can be used herein to refer to any type of relationship, direct or indirect, between the components in question, and can apply to electrical, mechanical, fluid, optical, electromagnetic, electro-mechanical or other connections. Additionally, the terms "first," "second," etc. are used herein only to facilitate discussion, and carry no particular temporal or chronological significance unless otherwise indicated. The terms "cause" or "causing" means to make, force, compel, direct, command, instruct, and/or enable an event or action to occur or at least be in a state where such event or action can occur, either in a direct or indirect manner.

Although a number of illustrative examples are described herein, it should be understood that numerous other modifications and examples can be devised by those skilled in the art that will fall within the spirit and scope of the principles of the foregoing disclosure. More particularly, reasonable variations and modifications are possible in the component parts and/or arrangements of the subject combination arrangement within the scope of the foregoing disclosure, the drawings and the appended claims without departing from the spirit of the foregoing disclosure. In addition to variations and modifications in the component parts and/or arrangements, alternative uses will also be apparent to those skilled in the art. The examples can be combined to form additional examples.

I claim:

1. An aircraft passenger door comprising:
a door main body; and
a door handle mechanism coupled to the door main body, wherein the door handle mechanism comprises:
a vent panel;
a handle lever having a lift-to-open configuration; and
a four bar mechanism coupled to the handle lever and the vent panel, the four bar mechanism to time sequence operations to close the aircraft passenger door, latch the aircraft passenger door, lock the aircraft passenger door, and close the vent panel in response to the handle lever being toggled between a closed position and an open position, wherein the four bar mechanism comprises a lock pawl to prevent closing the vent panel until the aircraft passenger door is locked,
wherein the lock pawl engages a vent monitor tab of a vent monitor while a latch lock finger of a latch mechanism is not engaged with a lock sector of a lock mechanism to prevent the vent panel from closing while the aircraft passenger door is unlocked,
wherein the lock pawl engages the vent monitor tab while the latch lock finger engages the lock sector to prevent the vent panel from closing while the aircraft passenger door is locked,
wherein the lock pawl is disengaged from the vent monitor tab while the latch lock finger is engaged with the lock sector so that the lock pawl does not prevent the vent panel from closing while the aircraft passenger door is locked, and
wherein the lock pawl is disengaged from the vent monitor and the latch lock finger is engaged with the lock sector so that the vent panel is closeable.

2. The aircraft passenger door of claim 1, further comprising a hinge coupled to the door main body and located at an outer rim of the door main body, wherein the door handle mechanism is located at a spaced lateral position with respect to the hinge.

3. The aircraft passenger door of claim 1, wherein the handle lever is incorporated into one bar of the four bar mechanism.

4. The aircraft passenger door of claim 1, wherein the handle lever is a separate part from each bar of the four bar mechanism.

5. The aircraft passenger door of claim 4, wherein one bar of the four bar mechanism comprises a mechanism operator that is separate from the handle lever and is connected to a handle rod.

6. The aircraft passenger door of claim 5, the door handle mechanism further comprising a tension spring to bias the mechanism operator towards the closed position.

7. The aircraft passenger door of claim 1, the door handle mechanism further comprising:
a latch rod coupled to the four bar mechanism via a latch shaft;
a latch mechanism coupled to the latch rod; and
wherein the latch shaft has an over-center position when the aircraft passenger door is locked, and wherein the over-center position is to drive the latch mechanism towards a locking position prior to driving the latch mechanism towards an unlocking position to prevent the latch mechanism from being capable of back-driving a lock mechanism.

8. The aircraft passenger door of claim 1, wherein the four bar mechanism has two bars of the four bar mechanism that are positioned to cross one another.

9. The aircraft passenger door of claim 1, wherein the four bar mechanism further comprises a lock blocking feature to prevent opening of the aircraft passenger door when the vent panel is closed.

10. The aircraft passenger door of claim 1, the door handle mechanism further comprising a biasing mechanism to bias the vent panel towards an open arrangement.

11. A door handle mechanism comprising:
a vent panel;
a handle lever having a lift-to-open configuration; and
a four bar mechanism coupled to the handle lever and the vent panel, the four bar mechanism configured to close the vent panel in response to the handle lever being toggled between a closed position and an open position, wherein the four bar mechanism comprises a lock pawl,
wherein the lock pawl engages a vent monitor tab of a vent monitor while a latch lock finger of a latch mechanism is not engaged with a lock sector of a lock mechanism to prevent the vent panel from closing while a door is unlocked,
wherein the lock pawl engages the vent monitor tab while the latch lock finger engages the lock sector to prevent the vent panel from closing while the door is locked,
wherein the lock pawl is disengaged from the vent monitor tab while the latch lock finger is engaged with the lock sector so that the lock pawl does not prevent the vent panel from closing while the door is locked, and
wherein the lock pawl is disengaged from the vent monitor and the latch lock finger is engaged with the lock sector so that the vent panel is closeable.

12. The door handle mechanism of claim 11, wherein the handle lever is incorporated into one bar of the four bar mechanism.

13. The door handle mechanism of claim 11, wherein the handle lever is a separate part from each bar of the four bar mechanism, and wherein one bar of the four bar mechanism comprises a mechanism operator that is separate from the handle lever and is connected to a handle rod.

14. The door handle mechanism of claim 13, the door handle mechanism further comprising a tension spring to bias the mechanism operator towards the closed position.

15. The door handle mechanism of claim 11, the door handle mechanism further comprising:
a latch rod coupled to the four bar mechanism via a latch shaft;
a latch mechanism coupled to the latch rod; and
wherein the latch shaft has an over-center position, and wherein the over-center position is to drive the latch mechanism towards a locking position prior to driving the latch mechanism towards an unlocking position to prevent the latch mechanism from being capable of back-driving a lock mechanism.

16. The door handle mechanism of claim 11, wherein the four bar mechanism has two bars of the four bar mechanism that are positioned to cross one another.

17. The door handle mechanism of claim 11, wherein the four bar mechanism further comprises a lock blocking feature.

18. The door handle mechanism of claim 11, the door handle mechanism further comprising a biasing mechanism to bias the vent panel towards an open arrangement.

19. A method comprising:
toggling a handle lever between a closed position and an open position, wherein the handle lever has a lift-to-open configuration;
timing sequencing of operations to close an aircraft passenger door, latch the aircraft passenger door, lock the aircraft passenger door, and close a vent panel in response to the handle lever being toggled between the closed position and the open position, and wherein the timing of the sequencing of operations is performed via a four bar mechanism coupled to the handle lever and the vent panel;
during a closing of the aircraft passenger door blocking a vent monitor from rotating via a lock pawl of a locking mechanism engaging the vent monitor;
engaging, by the lock pawl, a vent monitor tab of a vent monitor while a latch lock finger of a latch mechanism is not engaged with a lock sector of a lock mechanism to prevent the vent panel from closing while the aircraft passenger door is unlocked;
engaging, by the lock pawl, the vent monitor tab while the latch lock finger engages the lock sector to prevent the vent panel from closing while the aircraft passenger door is locked;
disengaging the lock pawl from the vent monitor tab while the latch lock finger is engaged with the lock sector so that the lock pawl does not prevent the vent panel from closing while the aircraft passenger door is locked; and
disengaging the lock pawl from the vent monitor and the latch lock finger is engaged with the lock sector so that the vent panel is closeable.

20. The method of claim 19, wherein said during the closing of the aircraft passenger door:
latching the aircraft passenger door via the latch mechanism;
preventing closing the vent panel until the aircraft passenger door is locked in response to the lock pawl engaging the vent monitor;
clearing the lock pawl from the vent monitor;
locking the aircraft passenger door via the locking mechanism; and closing the vent panel;

during an opening of the aircraft passenger door:

driving the latch mechanism towards a locking position prior to driving the latch mechanism towards an unlocking position to prevent the latch mechanism from being capable of back-driving the lock mechanism;

preventing disengagement of the lock mechanism via a lock blocking feature of the locking mechanism engaging the vent monitor;

preventing opening of the aircraft passenger door when the vent panel is closed in response to the lock blocking feature engaging the vent monitor;

clearing the lock blocking feature from the vent monitor;

opening the vent panel;

unlocking the aircraft passenger door via the locking mechanism; and unlatching the aircraft passenger door via the latch mechanism.

* * * * *